United States Patent [19]
Huebscher et al.

[11] 3,991,572
[45] Nov. 16, 1976

[54] ELECTRO-THERMAL LINEAR ACTUATOR WITH INTERNAL RESERVOIR

[75] Inventors: Richard G. Huebscher, Cleveland; Ronald S. Sobecks, Seven Hills; Joseph A. Birli, Richmond Heights, all of Ohio

[73] Assignee: Gould Inc., Chicago, Ill.

[22] Filed: Oct. 20, 1975

[21] Appl. No.: 623,669

[52] U.S. Cl. .................................. 60/531; 219/270
[51] Int. Cl.² ................................................ F03G 7/06
[58] Field of Search............ 60/530, 531; 200/81 R; 337/114, 115, 118, 120, 121; 219/511, 270

[56] References Cited
UNITED STATES PATENTS

| | | | |
|---|---|---|---|
| 2,398,471 | 4/1946 | Short et al. .................. | 60/531 X |
| 2,548,708 | 4/1951 | Dickey ....................... | 60/531 |
| 2,659,215 | 11/1953 | Massopust .................. | 60/531 X |
| 3,664,698 | 5/1972 | Stropkay .................... | 60/531 X |

FOREIGN PATENTS OR APPLICATIONS

| | | | |
|---|---|---|---|
| 593,326 | 5/1926 | France ....................... | 60/531 |

*Primary Examiner*—Martin P. Schwadron
*Assistant Examiner*—H. Burks, Sr.
*Attorney, Agent, or Firm*—Donnelly, Maky, Renner & Otto

[57] ABSTRACT

A partitioning sleeve is positioned in the main body of a thermal actuator to form a separate internal liquid reservoir from which fluid may be supplied to the actuator heater. The heater is part of a heater subassembly that is sealed in an opening formed in the main body of the actuator so that the coil-type electric resistance heater is accurately positioned for submersion in liquid in the variable volume chamber formed in the main body of the actuator. Moreover, the recycling or cool down time for the thermal actuator is reduced by thermal transfer between an appreciable contacting surface area of an extensible diaphragm that partly forms the actuator chamber and a guide cap that also supports and guides the diaphragm during its extension to enlarge the variable volume chamber.

11 Claims, 5 Drawing Figures

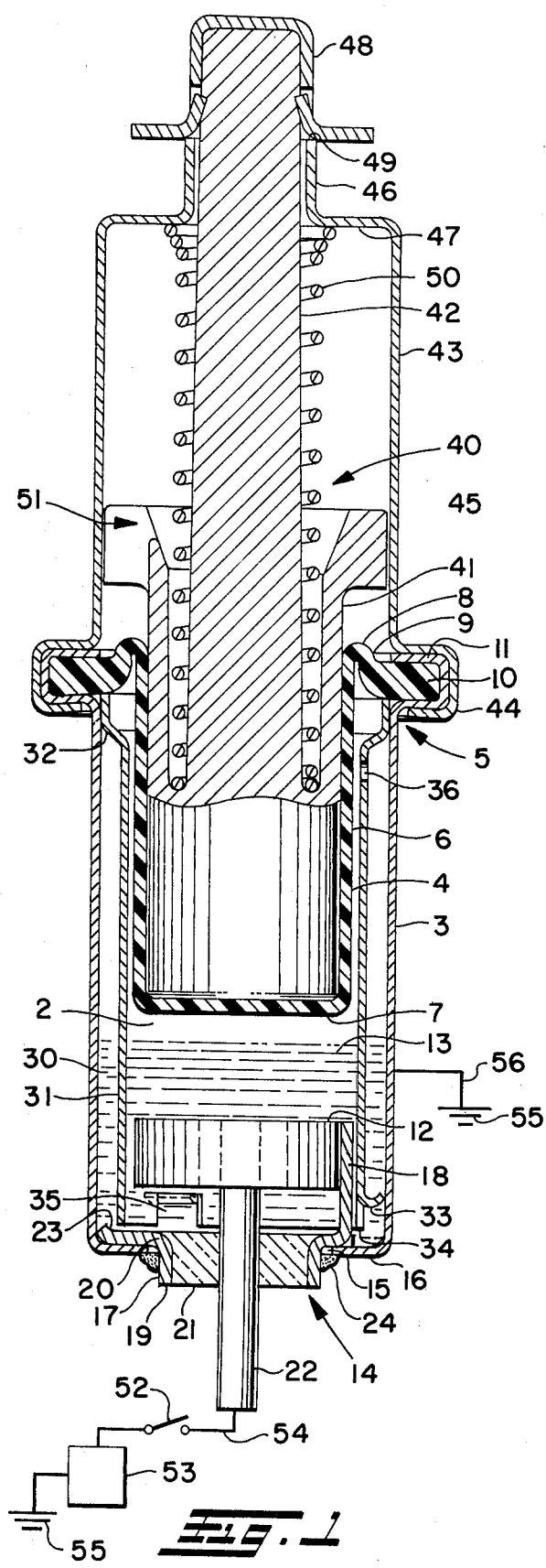
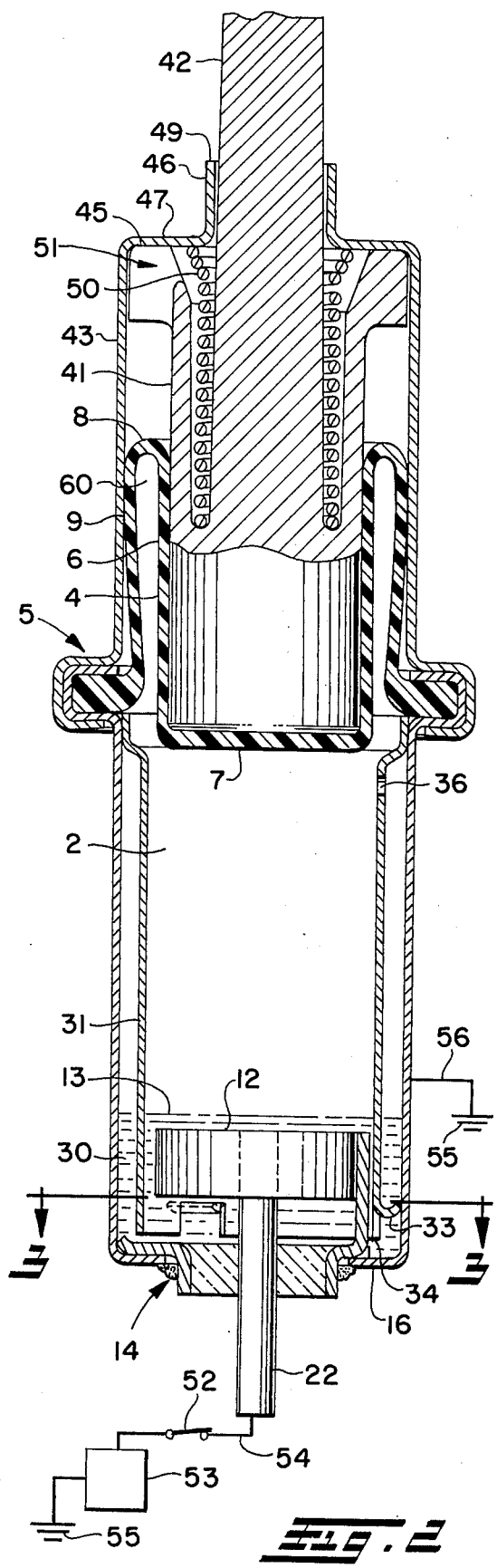

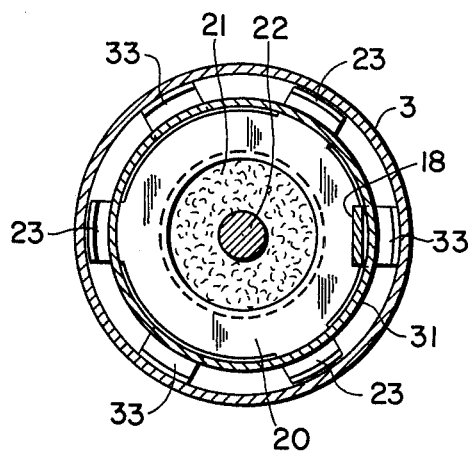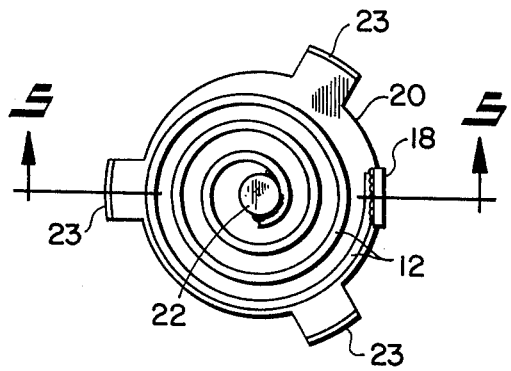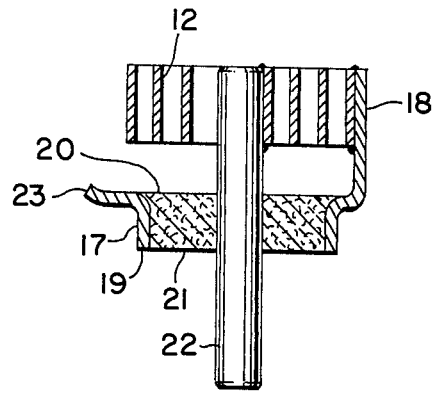

3,991,572

ELECTRO-THERMAL LINEAR ACTUATOR WITH INTERNAL RESERVOIR

BACKGROUND OF THE INVENTION

This invention is directed to a thermal actuator and, more particularly, to an electro-thermal actuator having an internal fluid reservoir in the variable volume chamber. Moreover, the present invention also is directed to an improved electrical feed through connection for a thermal actuator having an internal electric resistance heater and to an arrangement for reducing the time required for recycling a thermal actuator.

A typical fluid actuator usually has a variable volume chamber that expands and contracts in response to pressure increases and decreases therein. The changes in chamber volume may be readily converted to a linear or other mechanical output to perform work on an external device. In one type of fluid actuator an external fluid supply is provided to the chamber for increasing and decreasing the pressure therein, and in another type of fluid actuator the chamber is sealed and contains an expansible and contractible working medium. In the latter type fluid actuator changes in the chamber pressure may be effected by applying to the working medium energy, such as thermal energy in the form of heat or cold. The thermal energy may be applied via part of the actuator main body, casing, or the like, for example, through a heat conductive window; or the thermal energy may be applied, for example, by a heater located in the variable volume chamber. Moreover, in the latter type actuator, which will be referred to hereinafter as a thermal actuator regardless of the energy input, various types of working media may be used, such as, for example, liquids that undergo a liquid to gas phase change upon application of heat, metal hydrides that out gas in response to the application of heat, thermally responsive waxes, or any other material that will effect a change in the chamber pressure in response to application of energy thereto.

In thermal actuators that use a liquid working medium which undergoes a liquid to gas phase change upon application of heat, it is desirable to have a supply of liquid at the heated area to avoid excessive temperatures thereat and, particularly, in those thermal actuators that have internal electric heaters the liquid supply cools the heater and reduces the possibility of burn out. Also, since thermal actuators may experience some leakage, for example by permeation through the extensible member, which may be a diaphragm, the reservoir liquid will ensure an adequate supply of liquid to the heater over a relatively long life of the actuator. An absorbent or wicking-type reservoir that provides a fluid supply to the heater of the thermal acutator is disclosed in U.S. Pat. Ho. 3,805,528.

Moreover, for those thermal actuators that include an internal electric resistance heater or the like, it is desirable to ensure the integrity of the heater and the electrical connections thereto while at the same time maintaining the sealed condition of the variable volume chamber.

Usually a thermal actuator may be energized to a maximum output or outstroke condition in a relatively short time compared to the time required for recycling or cool down of the actuator to an instroke condition. Therefore, it is also desirable to reduce the required recycling time to improve the operational characteristics and use options of a thermal actuator.

SUMMARY OF THE INVENTION

Within the variable volume chamber of a thermal actuator that uses a liquid working medium, which undergoes a liquid to gas phase change upon being heated, a sleeve partition is located to separate a quantity of the liquid working medium from direct application of heat by the internal electrical heater. The partitioning sleeve thus forms a liquid reservoir within the actuator chamber, and liquid from that reservoir is supplied to the heater as required to maintain the latter submerged in liquid primarily for cooling purposes and to ensure prompt actuator response upon energization. The reservoir effectively supplements the fluid charge of the actuator effectively to make up for the leakage or other loss of working medium from the chamber.

Moreover, a heater sub-assembly for a thermal actuator includes an electric resistance heater with appropriate mechanical support and electrical connections therefor by an integral mounting structure that is readily attached in an opening of the actuator body or casing. The mounting structure of the heater sub-assembly facilitates both sealing the same to the actuator casing to maintain the sealed integrity of the actuator chamber and accurate positioning of the electric resistance heater within the actuator chamber for efficient actuator operation.

An extensible member, such as a diaphragm, bellows, series-connected concentric sleeves, or the like, is secured to the actuator casing to form the variable volume chamber, and a guiding or motion limiting cap of the actuator provides for guidance of the extensible member during its movements to expand and to contract the actuator chamber. The guide cap also to an extent protects the extensible member from damage by an external object and provides linear guidance for a piston assembly that converts changes in the chamber volume to a mechanical output.

By providing an appreciable contact area between the walls of the guide cap and the extensible member when the latter is in its chamber expanded condition and by permitting a quantity of the expanded working medium to come into contact with walls of the extensible member proximate that surface area, the working medium will be cooled relatively rapidly thereby to reduce the recycling time of the actuator.

With the foregoing in mind, it is a principal object of the invention to provide a fluid actuator improved in the noted respects.

Another object of the invention is to avoid the possibility of heater burn out in an electro-thermal linear actuator and especially to avoid such burn out by providing a reserved fluid supply to the internal electric resistance heater of an electro-thermal linear actuator.

An additional object of the invention is to provide an internal liquid reservoir for a thermal actuator.

A further object of the inventon is to provide an improved heater sub-assembly for an electro-thermal linear actuator to maintain the sealed integrity of the actuator chamber and to facilitate accurate and effective positioning of the electric heater in the actuator chamber.

Still another object of the invention is to reduce the recycling time required for a thermal actuator.

These and other objects and advantages of the present invention will become more apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

BRIEF DESCRIPTION OF THE DRAWINGS

In the annexed drawings:

FIG. 1 is an elevation view shown mostly in section of a de-energized electro-thermal linear actuator in accordance with the invention;

FIG. 2 is an elevation view shown mostly in section of an energized electro-thermal linear actuator in accordance with the invention;

FIG. 3 is a plan view partly in section showing the base portion of the thermal actuator of the invention, as indicated looking in the direction of the arrows 3—3 of FIG. 2;

FIG. 4 is a top view of the heater sub-assembly of the invention; and

FIG. 5 is an elevation view mostly in section of the heater sub-assembly looking in the direction of the arrows 5—5 of FIG. 4.

DESCRIPTION OF THE PREFERRED EMBODIMENT

The electro-thermal linear actuator of the invention will be described in more detail below with reference to a particular type of thermal actuator, which uses a liquid working medium that undergoes a liquid to gas phase change upon being heated by an electric resistance heater located in the actuator chamber. Also, the variable chamber in the preferred form of the actuator is formed by a relatively rigid body to which an extensible diaphragm member is secured. It is to be noted, however, that the principles of the invention may be incorporated in other types of thermal actuators, for example which operate in response to externally applied heat, internally or externally applied cold, or other type of energy input; which use other types of working media; or which use other types of extensible members.

Referring now more particularly to the drawings, wherein like reference numerals designate like parts in the several figures, the electro-thermal linear actuator of the invention is generally indicated at 1 in FIGS. 1 and 2. In FIG. 1 the thermal actuator is shown in a de-energized condition and in FIG. 2 the thermal actuator is shown in an energized condition.

A variable volume fluid chamber 2 is defined in the fluid actuator 1 by a cylindrical main body or casing 3 to which an extensible diaphragm member 4 is secured in sealed engagement at a crimped sealed connection 5. The diaphragm 4 is preferably of the unreinforced natural or synthetic rubber-like material type and includes a cylindrical cap portion 6 that projects into the chamber 2 and terminates at one end in a relatively flat round surface area 7 and at the other end in an annular fold 8. The diaphragm 4 also includes a cylindrical leg portion 9, which varies in length opposite to length variation of the cap portion 6, extending between the annular fold 8 and a relatively flat annular flange portion 10 that is held to the main body 3 by a crimped over portion 11 thereof to form the seal connection 5. Preferably the diaphragm member 4 is of the unreinforced type to permit some stretching thereof when the thermal actuator 1 is energized, although, if desired, a diaphragm reinforced with fabric or other material also may be used depending on the required actuator specifications, such as the diaphragm strength, actuator recycling time, and so on.

A coil type electric resistance heater 12 is mounted in the fluid chamber 2 to heat the liquid working medium 13 therein in order to vaporize a portion of that liquid to effect a pressure increase in the chamber and enlargement thereof in response to the pressure increase. The electric heater 12 is included as part of a heater sub-assembly 14 that is secured to the main body 3 in a circular opening 15 formed in the base 16 thereof.

The heater sub-assembly 14, which is also clearly shown in FIGS. 3, 4 and 5, includes an electrically conductive mounting support 17 that has an upstanding tab 18 to which one end of the heater 12 is attached, for example, by spot welding, to provide one mechanical support and electrical connection for the heater. The mounting support 17 has a short cylindrical extent 19 that terminates in a flat annular or washer-like land portion 20, and located in the volume defined within the cyclindrical extent 19 is a temperature resistant electrically non-conductive material 21 such as, for example, fused glass or the like, that retains an electrically conductive stud 22 in position while at the same time providing a sealed closure of the mentioned volume. The inner end of the coil type electric resistance heater 12 is also spot welded or otherwise attached to the stud 22 to provide the other mechanical support and electrical connection therefor. A number of radially extending relatively flat fingers 23 project from the land 20 for increasing the strength of the heater sub-assembly and for further facilitating the accurate positioning thereof with respect to the main body opening 15, and the location of the land portion 20 and the fingers 23 in abutment with the inside wall of the main body base 16 allows force generated in the chamber against the mounting support and fused glass 21 to be transferred directly to the base 16. Moreover, a quantity of sealant 24 may be applied in the opening 15 after the heater sub-assembly has been located therein to secure the sub-assembly to the main body and to maintain the fluid tight integrity of the chamber 2.

The completed heater sub-assembly 14 is easily positioned in the opening 13 of the main body 3 by insertion from the top of the latter, and upon such positioning the electric heater 12 is located accurately a suitable distance above the bottom of the chamber 2 for submersion in the liquid therein. As noted above, the stud 22 provides one electrical connection for the heater 12. The tab 18 provides the other heater electrical connection, for example, via the electrically conductive material of the main body or casing 3, which permits the entire actuator casing to be maintained, for example, at a safe ground potential.

It is desirable that the heater 12 be submerged in the liquid working medium 13 upon energization so that the liquid will cool the heater to avoid burn out. Therefore, the initial charge of liquid working medium to the chamber 2 is sufficient to cover or substantially to cover the heater 12 when the actuator 1 is in the vertical upright position as shown in FIGS. 1 and 2. Actually, in the preferred embodiment of the invention the initial charge of liquid working medium is sufficient to effect full submersion of the electric heater 12 even when the actuator 1 is tilted at an angle of from 30° to 60° from the vertical direction. If desired, however, the initial liquid charge to the chamber 2 may substantially fill the latter when the actuator 1 is in its de-energized condition so that the heater 12 will be submerged in liquid whenever the actuator is de-energized regardless of the actuator orientation. The magnitude of the initial liquid charge may vary the actuator response time, and, therefore, an optimum charge should be selected with consideration given to response time, actuator orientation, leakage or permeation rates, and the like.

Various types of liquid working media may be used in the thermal actuator 1. A preferred liquid working medium is known as fluoro-inert liquid sold under the trademark FC by the 3-M Company. The FC fluids comprise fluorine and carbon, and there are various types of these fluids, each of which has a different temperature at which a liquid to gas phase change occurs. A particular advantage to using the FC fluids is that the different types may be mixed to vary the temperature at which the mixture will undergo a liquid to gas phase change for optimum actuator design. Another type of suitable working medium has been found to be a halogenated hydrocarbon containing a fluorine atom, such as, for example, a material sold under the trademark FREON by the DuPont Company. The FC fluids and FREON are inert, dielectric, and readily vaporized upon being heated to a suitable temperature by the heater 12 of the actuator 1. Other types of preferably inert and dielectric liquid working materials also may be used.

A liquid reservoir 30 is formed in the chamber 2 by a cylindrical partition 31 that defines between its outer wall and the inner wall of the main body a volume which is shielded from direct application of heat generated by the heater 12. The partition 31 is generally concentric about a common axis with the main body 3 and is spaced inwardly from the inner walls of the main body 3 by an enlarged diameter upper end portion 32 that engages the inner wall of the body and by several, for example, three, reverse bent spacer fingers 33. The spacer fingers 33 are reverse bent, as shown, for example, in FIGS. 1 and 2, to permit the partition 31 to be urged easily into the main body 3 after the heater sub-assembly 14 has been positioned in the opening 15, and the three spacer fingers have some degree of resilience so as to cooperate with each other substantially to center the partition with respect to the main body 3. Also, if desired, the terminal edges of the spacer fingers 33 may be relatively sharp to bite into the inner wall of the main body 3 making it difficult to withdraw or to force the partition 31 from its position in the main body 3.

Preferably the bottom end 34 of the cylindrical partition 31 terminates above the bottom of the main body 3 and also above the land portion 20 and fingers 23 of the heater sub-assembly mounting support 17 in order to ensure a relatively unimpeded flow path for liquid from the reservoir 30 to the heater 12. Alternatively, if there is sufficient area for liquid to flow from the reservoir to the heater through open areas 35 left in the partition wall as a result of the upwardly bent spacer fingers 33, then the bottom end 34 of the partition may abut the base 16 of the main body. A vacuum release opening 36 in the cylindrical partition 31 proximate its upper end allows the reservoir liquid readily to flow to supply the heater 12 as the latter is energized. Moreover, the partition 31 may be formed of electrically conductive or non-conductive material, and although the partition preferably is spaced out of direct engagement with the heater 12 and the tab 18 of the heater sub-assembly, direct engagement with either will not appreciably detract from the normal operation of the actuator 1, especially when the main body 3 is formed of electrically conductive material and provides for one electrical connection to the heater.

A piston assembly 40 of the actuator 1 includes a cylindrical piston 41 located behind the diaphragm 4 in engagement with the cylindrical cap portion 6 for support and/or reinforcement of the same. The piston assembly 40 also includes an elongated rod 42, which may be integral with the piston, and the rod is adapted to transmit to an external device a force over a stroke distance when the actuator 1 is energized. A cylindrical guide cap 43, which is secured to the main body 3 at a folded flange connection 44, provides for linear guidance of the piston assembly 40 in cooperation with a cylindrical piston skirt 45 and with the rod 42, which passes through a reduced diameter cylindrical outlet 46 of the guide cap 43. The top flat end wall 47 of the guide cap 43 provides an end stop to limit the maximum outstroke or outward travel of the piston assembly 40, and a snap on nut 48, such as a PAL nut, at the end of the rod 42 cooperates with the upper-most end 49 of the guide cap cylindrical outlet 46 to provide a stop that limits the maximum instroke or inward travel of the piston assembly 40 and the maximum extent of the diaphragm cylinder cap portion 6 projection into the chamber 2. The nut prevents the diaphragm end 7 from striking the heater 12 that may damage either of them.

A return spring 50, which abuts the guide cap end wall 37 and the piston 41 normally urges the piston assembly and the diaphragm supporting cap portion 6 toward an instroke or inward position in the thermal actuator 1, as shown in FIG. 1. The spring 50 may be chosen to exert a relatively light return force for a thermal actuator that is intended to provide an output in only a single direction when energized or to exert a relatively large force so that the rod 42 may be coupled to do work not only upon outstroking when the actuator is energized but also upon instroking when the actuator is de-energized. A slot 51 in the piston skirt 45 facilitates blowing out of the diaphragm and release of excess fluid from the actuator without disassociation of the actuator parts in the event of excessive pressure in the chamber 2, as described in my copending U.S. Ser. No. 557,801, filed Mar. 12, 1975, for "Linear Fluid Actuator Device," which application is assigned to the same assignee as the present application.

The thermal actuator of the invention may be readily manufactured, for example, using steel or aluminum materials for the casing 2, sleeve 31 and cap 43, which may be fabricated using an eyelet procedure. The heater sub-assembly also facilitates manufacture of the actuator, which may have an internal diameter less than 1 inch, whereby the sub-assembly may be easily inserted in place and secured by the sealant 24 with the electric heater 12 then being properly positioned in the chamber 2 to allow adequate clearance for the sleeve partition 31. After being charged with working medium the chamber is sealed by crimping the diaphragm 4 at its annular flange 10, and with the piston assembly, return spring and guide cap in assembled position, the actuator 1 then forms an integral package ready for use.

The thermal actuator 1 may be energized, preferably with the heater 12 submerged in liquid, by closure of a switch 52 to supply electric power to the heater from an electric power supply, such as a battery 53, via a lead 54 and the stud 22. The other side of the battery may be grounded for example, at 55, and that ground connection also may be connected by a lead 56 to the main body or casing 3 of the actuator, as described above, to complete a closed circuit to the heater 12.

Upon energization of the actuator 1, for example, by closure of the switch 52, as shown in FIG. 2, at least some of the fluid proximate the hot energized heater 12 will vaporize causing an increase of pressure in the chamber 2 and expansion thereof as the projecting diaphragm cap portion 6 and supportive piston 41 therebehind are urged to outstroke against the force of the return spring 50. The partition 31 prevents direct application of heat to the liquid contained in the reservoir 30 and maintains that liquid relatively cool. Therefore, as the liquid proximate the heater is vaporized, the reservoir liquid, which can flow easily because of the release of any vacuum in the reservoir with respect to the rest of the chamber 2 via the opening 36, will re-supply the heater to maintain the heater substantially or completely submerged in liquid cooling the heater and avoiding overheating or burn out thereof.

As pressure in the chamber 2 increases, the force exerted against the diaphragm surface area 7 also increases, and when that force exceeds the force exerted by the spring 50 and any force exerted by an external load, the piston assembly 40 and the diaphragm cylindrical cap portion 6 will be urged toward their outstroked position as shown, for example, in FIG. 2. Upon outstroking the diaphragm 4 will move by a rolling action along its annular fold 8 and the extent that the diaphragm cylindrical cap portion 6 projects into the chamber 2 will diminish while the length of the cylindrical leg 9 increases until a maximum outstroke position is reached.

The diaphragm 4 may be relatively pliable so that when it is in its full outstroked position, as shown in FIG. 2, the cylindrical leg portion 9 will engage an appreciable surface area of the inner wall of the cylindrical guide cap 43 while also forming a relatively large volume 60 in the convolution defined with the wall of the diaphragm cylindrical cap portion 6 and the annular fold 8. The guide cap 43 then provides some degree of support for the diaphragm and also limits its movement capability. Moreover, the guide cap 43 preferably is formed of a good heat conductive material, such as aluminum, steel, or the like so that vaporized fluid in the convolution volume 60 may be cooled relatively by thermal transfer between the abutting surface areas of the guide cap and diaphragm cylindrical leg portion 9 to effect a reduction in the overall time required for recycling or cool down of the thermal actuator 1.

Preferably the liquid charge to the actuator 1 is sufficient so that the heater 12 will remain submerged even when the piston and diaphragm are at the full outstroke condition. This characteristic will reduce recycling time by rapidly cooling the de-energized heater with liquid and also will increase the longevity of the actuator by preventing excessive heating temperatures.

After the actuator has achieved a suitable outstroke distance of the rod 42, the switch 56 may be opened automatically or manually to de-energize the heater 12. Vapor in the chamber 2 then will condense back to a liquid reducing pressure in the chamber, and the return spring 50 will urge the piston assembly 40 and the diaphragm cylindrical cap portion 6 toward their instroked positions. Ultimately the thermal actuator 1 will resume its wholly de-energized state, as shown in FIG. 1, with a submerged heater 12 and a quantity of liquid contained in the reservoir 30 at a depth equal to the depth of liquid in which the heater is directly submerged.

The embodiments of the invention in which an exclusive property or privilege is claimed are defined as follows:

1. A thermal actuator, comprising a main body, means for forming a variable volume fluid chamber with said main body, a thermally expansible fluid in said fluid chamber, means for applying heat to at least a portion of said fluid to cause expansion thereof tending to increase pressure in said fluid chamber, and means for partitioning said fluid chamber normally to store a quantity of said fluid remote from said means for applying heat, said means for partitioning including means for feeding fluid to said means for applying heat to avoid overheating of the latter.

2. A thermal actuator as set forth in claim 1, wherein said means for partitioning comprises a sleeve.

3. A thermal actuator as set forth in claim 2, wherein said fluid chamber has a generally cylindrical configuration and said sleeve comprises a cylindrical sleeve positioned substantially on a common longitudinal axis with the cylindrical extent of said fluid chamber and spaced inwardly with respect to the main body wall defining said fluid chamber.

4. A thermal actuator as set forth in claim 3, further copmrising means for positioning said sleeve in such spaced relation with respect to said main body, said means for positioning including means for impeding withdrawal of said sleeve from said fluid chamber.

5. A thermal actuator as set forth in claim 1, wherein said means for applying heat comprises an electric resistance heater in said fluid chamber and means for coupling said heater to supply of electrical energy.

6. A thermal actuator as set forth in claim 1, wherein said means for forming comprises a diaphragm cooperable with said main body to form said fluid chamber.

7. A thermal actuator as set forth in claim 6, wherein said diaphragm has a cylindrical cap portion projecting into said fluid chamber, a variable length cylindrical leg portion, and an annular fold joining said cylindrical cap portion and said cylindrical leg portion, whereby said diaphragm is capable of movement to vary the volume of said fluid chamber by a rolling action along its annular fold to vary the length of said cap portion projection into said fluid chamber with a corresponding opposite variation in the length of said cylindrical leg portion, said fluid chamber having a generally cylindrical configuration, and said means for partitioning comprising a cylindrical sleeve positioned substantially on a common longitudinal axis with the cylindrical extent of said diaphragm cap portion and being spaced inwardly with respect to the main body defining and outwardly with respect to said diaphragm cap portion.

8. A thermal actuator as set forth in claim 7, further comprising piston assembly means in supportive engagement with said diaphragm cylindrical cap portion for transmitting an output force in response to the force exerted on the latter by increased pressure in said fluid chamber, and means for guiding said diaphragm and said piston assembly means for substantially linear movement thereof.

9. A thermal actuator as set forth in claim 1, wherein said thermally expansible fluid comprises a liquid that undergoes a gaseous phase change upon application of heat thereto.

10. A thermal actuator as set forth in claim 9, wherein said means for applying heat comprises an electrically conductive holder positioned in an opening through said main body and secureable in sealed engagement with said main body, said holder having a generally central opening and an integral upstanding tab positioned to extend toward the interior of said fluid chamber, an electrically conductive stud extending through said central opening, electrically non-conductive means for sealing said central opening with said stud securely positioned electrically isolated from said holder, and electric heater means for heating said liquid to vaporize at least a portion of the same to increase pressure in said fluid chamber, said electric heater means being coupled to said tab and to said stud for mechanical support submerged in said liquid when the thermal actuator is de-energized, and said tab and stud providing for coupling of said electric heater means for electric energization thereof.

11. A thermal actuator as set forth in claim 1, wherein said fluid chamber has a generally longitudinal extent having opposed ends, said means for applying heat being positioned proximate one end of said fluid chamber, and said means for partitioning comprises a sleeve having a longitudinal extent substantially coextensive with that of said fluid chamber and including a vacuum release opening proximate the other end of said fluid chamber remote from said means for applying heat.

* * * * *

UNITED STATES PATENT OFFICE
CERTIFICATE OF CORRECTION

PATENT NO. : 3,991,572
DATED : November 16, 1976
INVENTOR(S) : Richard G. Huebscher, et al It is certified that error appears in the above-identified patent and that said Letters Patent are hereby corrected as shown below:

Column 6, lines 50 and 51, "557,801, filed Mar. 12, 1975, for 'Linear Fluid Actuator Device,'" should read: --573,984, filed May 2, 1975, for "Safety Blow-Out Protection for Fluid Actuators,"--

Column 7, line 65, "56" should read --52--

Signed and Sealed this

Eighth Day of February 1977

[SEAL]

Attest:

RUTH C. MASON
Attesting Officer

C. MARSHALL DANN
Commissioner of Patents and Trademarks